United States Patent

[11] 3,563,318

| [72] | Inventors | Norman C. Eberhardt<br>Box 281;<br>Lee L. Ludwig, Box 242, Cut Bank, Mont. 59427 |
|---|---|---|
| [21] | Appl. No. | 719,001 |
| [22] | Filed | Apr. 5, 1968 |
| [45] | Patented | Feb. 16, 1971 |

[54] MOUNTING FOR CULTIVATING TOOL
4 Claims, 7 Drawing Figs.

[52] U.S. Cl.................................................. 172/750,
172/753, 172/775; 285/319; 287/104; 306/1.6
[51] Int. Cl......................................................... A01b 39/22
[50] Field of Search........................................ 172/750,
749, 753, 762, 773, 775; 306/1.5, 1.6, 21, 22, 42,
43; 287/23, 56, 119, 104; 285/305, 319; 24/208

[56]   References Cited
UNITED STATES PATENTS

| 507,509 | 10/1893 | Taylor............................ | 172/751 |
| 697,897 | 4/1902 | Smith............................. | 172/753 |
| 1,298,869 | 4/1919 | Bernier.......................... | 285/319 |
| 2,583,109 | 1/1952 | Luton............................ | 285/319X |
| 2,743,657 | 5/1956 | Kriegbaum.................... | 306/1.5 |
| 3,152,815 | 10/1964 | Barragato et al. ........... | 285/319X |

Primary Examiner—Robert E. Pulfrey
Assistant Examiner—C. Coughenour
Attorney—Young and Thompson ABSTRACT: A cultivating tool is mounted on a standard shank by means of a leaf spring having a portion spaced from one side of the shank and having a lower detent that snaps behind a sleeve that fits around the shank and is integral with the tool. A backstop is disposed between the leaf spring and the shank, the upper edge of the backstop cooperating with a second detent at the upper end of the leaf spring accurately to locate the leaf spring and the lower edge of the backstop accurately locating the upper edge of the sleeve of the tool. The assembly of shank and backstop and leaf spring is detachably held together by a bolt passing through them.

PATENTED FEB 16 1971

3,563,318

INVENTORS
NORMAN C. EBERHARDT
LEE L. LUDWIG

BY Young & Thompson
ATTORNEYS

MOUNTING FOR CULTIVATING TOOL

The invention relates to mountings for cultivating tools, more particularly to such mountings that are readily It is an object of the present invention to provide mountings for cultivating tools, by which the toll tools can be detachably secured to an and removed from a tool-supporting shank without the use of special implements.

Another object of the present invention is the provision of mountings for cultivating tools, in which the tools need not be rigidly held on the tool-supporting shank.

A further object of the present invention is the provision of a mounting for cultivating tools, which can be applied to existing tool-supporting shanks without major modification.

Finally, it is an object of the present invention to provide a mounting for cultivating tools, which will be relatively simple and inexpensive to manufacture and install, quick and easy to operate, and rugged and durable in use.

Other objects and advantages of the present invention will become apparent from a consideration of the following description, taken in connection with the accompanying drawing, in which.

Figure 1:
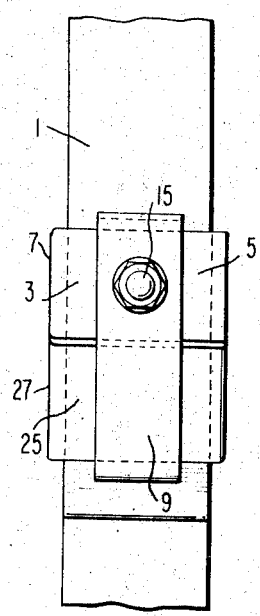
FIG. 1 is a fragmentary elevational view from the rear, showing one embodiment of mounting according to the present invention.
Figure 2:
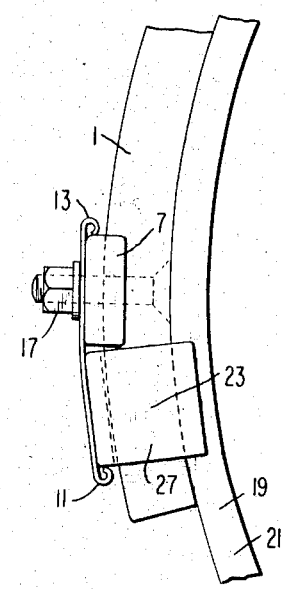
FIG. 2 is a side elevational view of the structure of FIG. 1.

Referring now to the drawing in greater detail, and first to the embodiment of FIGS. 1 and 2, there is shown a mounting for a cultivating tool, comprising a generally upright tool-supporting shank 1 of the type that is concave in a forward direction. Adjacent its lower end, shank 1 detachably supports a backstop 3 that has a body 5 disposed flat against the rear of shank 1 and forwardly extending flanges 7 disposed one on either side of shank 1 and that accurately locate backstop 3 on shank 1. On the rear side of body 5 of backstop 3 is releasably secured a resilient member in the form of a leaf spring 9. At its lower end, spring 9 has a portion that extends forwardly toward shank 1 to provide a first detent 11 formed by a rolled over end of spring 9. At its upper end, spring 9 has a second detent 13 similarly formed by a rolled over end of spring 9. Detent 13 rests against the upper edge of body 5 of backstop 3, thereby accurately to locate spring 9 relative to backstop 3. A countersunk bolt 15 passes through shank 1 and has its head flush with the forward surface of shank 1, and thence through body 5 of backstop 3 and spring 9 and has a nut 17 screwed on its rear end releasably but firmly to retain shank 1 and backstop 3 and spring 9 in assembled relationship with that portion of spring 9 between backstop 3 and firs first detent 11 spaced rearwardly from shank 1.

A cultivating tool 19, which may be in the form of a spike or plow or other ordinary tool, has a body 21 that is disposed on the forward side of shank 1, and a rearwardly extending sleeve 23 that encompasses shank 1. Sleeve 23 comprises a rear midportion 25 and a pair of forwardly extending legs 27 that are secured to the edges of the body 21. Midportion 25 is disposed between spring 9 and shank 1 in a horizontal direction and between first detent 11 and the lower edge of backstop 3 in a vertical direction.

To engage tool 19 in the FIG. 2 position, it is necessary only to push the lower end of spring 9 rearwardly, for example with a screwdriver or any other available implement, while inserting the lower end of shank 1 in sleeve 23 and pushing upwardly on the tool until sleeve 23 has the FIG. 2 position, whereupon detent 11 will snap under the lower edge of midportion 25 of sleeve 23, thereby retaining the tool assembled to the shank. The tool will not become disaligned or disassembled in ordinary use, because the relationships of backstop 3 and sleeve 23 and detent 11 on the one hand, and tool body 21 and shank 1 on the other hand, make for a firm assembly which nevertheless avoids being rigid in the sense of having no play.

Figure 3:
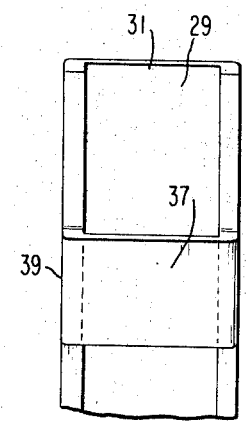
FIG. 3 is a fragmentary rear elevational view of the upper end of a second embodiment of a cultivating tool for use with the present invention.
Figure 4:
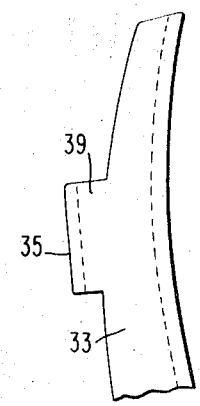
FIG. 4 is a side elevational view of the structure of FIG. 3.

To disassemble the tool 19 from shank 1, it is necessary only again to press back on spring 9 or detent 11 thereof, and then pull the tool off with downward force. FIGS. 3 and 4 show a variant form of tool for engagement with the mounting of FIGS. 1 and 2. In FIGS. 3 and 4, a tool 29 may for example be of the shovel type having a body 31 and rearwardly extending flanges 33 on opposite sides thereof. A sleeve 35 having a midportion 37 and forwardly extending legs 39 which are integral with rearwardly extending flanges 33. Apart from these differences in the shape of the shank-engaging portion of the tool, the tool connection indicated in FIGS. 3 and 4 is essentially the same as that of FIGS. 1 and 2 and the mode of assembly and disassembly is the same.

Figure 5:
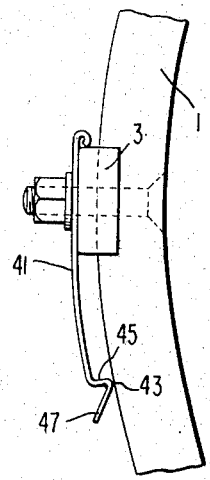
FIG. 5 is a fragmentary side elevational view of another modification, showing a different form of resilient member for releasable retention of a tool.

In FIG. 5 there is illustrated a variant from of mounting, in which the spring 41 is shaped somewhat differently from spring 9 of the previous embodiments, so a as to facilitate engagement of the tool with its mounting. Resilient member 41 has a first or lower detent 43 having an inwardly or forwardly projection portion 45 that then continues downwardly in a downwardly and outwardly inclined portion 47. Inclined portion 47 thus provides a ramp or inclined plane against which the rearwardly extending sleeve of a tool can be pressed upwardly so as to cam the lower end of resilient member 41 rearwardly away form shank 1, after which detent 43 snaps back to the FIG. 5 position behind and under the tool sleeve. The manner of removing the tool, in the FIG. 5 embodiment, is the same as in the preceding embodiments; but in the FIG. 5 embodiment, the tool sleeve itself serves as the implement by which the free lower end of the spring is forced rearwardly to permit insertion of the tool sleeve thereunder.

Figure 6:
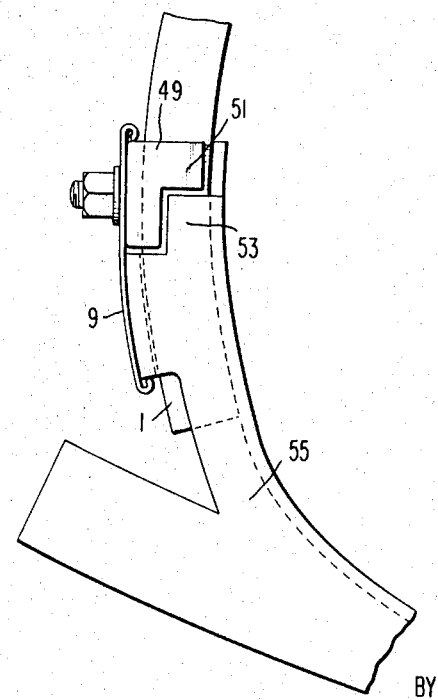
FIG. 6 is a view similar to FIG. 2 but showing still another embodiment of the invention.

Another variant form is shown in FIG. 6, in which the shank 1 and its spring 9 are the same as in the embodiment of FIGS. 1 and 2, but the backstop 3 of that earlier embodiment is replaced by a backstop 49 whose forwardly extending legs are somewhat more extensive than in the previous embodiments, and are characterized by stepped portions 51 that complementarily receive correspondingly shaped stepped portions 53 on the sleeve of a tool 55. In the FIG. 6 embodiment, the tool 55 is shown as of the plow type, thereby to illustrate the fact that the particular nature of the cultivating portion of the tool is of no importance to the present invention. The FIG. 6 embodiment thus is characterized by improved stability as between the tool and its support on the shank.

Figure 7:
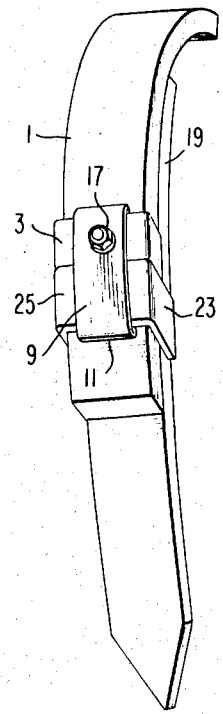
FIG. 7 is a reduced perspective view of the embodiment of FIGS. 1 and 2 in connection with a spike tool.

FIG. 7 shows the overall configuration of a tool and shank mounted according to the present invention, and showing the general relationship of the parts.

In view of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. A mounting for a cultivating tool, comprising a tool-supporting shank having a free lower end, a resilient member having a portion secured to the shank a distance above the free end of the shank, the resilient member extending from its secured portion downwardly along the shank toward the free end of the shank, the resilient member terminating in a free lower end, the resilient member having a detent adjacent its free lower end, the resilient member having a detent adjacent its free end that extends toward the shank, the resilient member being spaced from the shank between said secured portion and said detent, and a tool having a cultivating tool body disposed on the side of the shank opposite the resilient member, the tool having a sleeve that encircles the shank and is disposed between the resilient member and the shank and between the detent and said secured portion.

2. A mounting as claimed in claim 1, the resilient member having a second detent adjacent its upper end, said second detent extending toward the shank, a backstop secured to and projecting outwardly from the shank, the backstop having upper and lower edges and said second detent engaging the upper edge of the backstop, and means detachably securing the resilient member to the backstop, the detent adjacent the lower end of the resilient member being spaced a substantial distance from the lower edge of the backstop.

3. A mounting as claimed in claim 2, said securing means comprising a fastening member that passes through the resilient member and the backstop and the shank and detachably secures the backstop to the shank.

4. A mounting as claimed in claim 2, said tool sleeve being disposed between said lower edge and the detent which is adjacent the lower end of the resilient member.